(12) United States Patent
Wallhult et al.

(10) Patent No.: US 12,363,182 B2
(45) Date of Patent: Jul. 15, 2025

(54) SYSTEMS AND METHODS FOR COLLABORATIVE EDITING AN ELECTRONIC RESOURCE USING CLIENT DEVICE DESIGNATIONS

(71) Applicants: Atlassian Pty Ltd., Sydney (AU); Atlassian Inc., San Francisco, CA (US)

(72) Inventors: Oscar Wallhult, Sydney (AU); Patrick Streule, Sydney (AU); Jerome Touffe-Blin, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/126,136

(22) Filed: Dec. 18, 2020

(65) Prior Publication Data

US 2021/0234908 A1    Jul. 29, 2021

(51) Int. Cl.
*H04L 65/403*    (2022.01)
*G06F 3/0484*    (2022.01)
(Continued)

(52) U.S. Cl.
CPC .......... *H04L 65/403* (2013.01); *G06F 3/0484* (2013.01); *G06F 21/629* (2013.01); *H04L 63/102* (2013.01)

(58) Field of Classification Search
CPC ... H04L 65/403; H04L 63/102; G06F 21/629; G06F 3/0484; G06F 40/166; G06F 16/176; G06F 40/10; G06F 16/93; G06F 21/6209
See application file for complete search history.

(56) References Cited

U.S. PATENT DOCUMENTS 5,040,142 A * 8/1991 Mori ...................... G06Q 10/10
715/203
5,671,428 A * 9/1997 Muranaga .............. G06Q 10/10
715/201
(Continued)

FOREIGN PATENT DOCUMENTS

CN    102934105 A *  2/2013  ......... G06F 17/2288

OTHER PUBLICATIONS

Kaushik Rangadurai, Git Internals—How Git works (URL—https://www.linkedin.com/pulse/git-internals-how-works-kaushik-rangadurai), Jan. 22, 2015, 4 pages (Year: 2015).*
(Continued)

*Primary Examiner* — Yongjia Pan
(74) *Attorney, Agent, or Firm* — Brownstein Hyatt Farber Schreck, LLP

(57) ABSTRACT

Described herein is a computer-implemented collaborative editing system for editing of electronic resources including documents and other electronic information. The system includes: an editor interface for interfacing with an editor executing on a client device, the editor being configured to edit a resource; an editing identity module for causing the processing unit to store a designation of the client device as a privileged or a non-privileged editor; and an editing interface for causing the processing unit to: receive proposed edits to the resource from the editor interface and communicate the proposed edits to a remote collaborative editing service; receive remote proposed edits to the resource from the remote collaborative editing service and in the event that the client device is designated as a privileged editor, accept or reject the remote proposed edits and communicate the acceptance or rejection to the remote collaborative editing service.

17 Claims, 9 Drawing Sheets

(51) Int. Cl.
  *G06F 21/62*     (2013.01)
  *H04L 9/40*      (2022.01)

(56) References Cited

U.S. PATENT DOCUMENTS

| | | | | |
|---|---|---|---|---|
| 5,675,802 | A * | 10/1997 | Allen | G06F 8/71 |
| | | | | 717/103 |
| 5,781,732 | A * | 7/1998 | Adams | G06Q 10/10 |
| | | | | 709/205 |
| 6,067,551 | A * | 5/2000 | Brown | G06Q 10/10 |
| 7,353,252 | B1 * | 4/2008 | Yang | G06Q 10/10 |
| | | | | 709/204 |
| 7,496,841 | B2 * | 2/2009 | Hadfield | G06Q 10/10 |
| | | | | 715/255 |
| 7,499,904 | B2 * | 3/2009 | Gerhard | G06F 16/184 |
| 7,769,810 | B1 * | 8/2010 | Kaufman | G06F 40/166 |
| | | | | 709/248 |
| 8,073,811 | B2 * | 12/2011 | Strathearn | G06F 16/345 |
| | | | | 715/229 |
| 8,214,395 | B2 * | 7/2012 | Stevens | G06Q 10/10 |
| | | | | 707/783 |
| 8,341,224 | B2 * | 12/2012 | Kasetty | G06F 40/197 |
| | | | | 709/205 |
| 8,375,290 | B1 * | 2/2013 | Chan | G06F 16/93 |
| | | | | 715/229 |
| 8,612,380 | B2 * | 12/2013 | Kleppner | G06F 40/166 |
| | | | | 706/14 |
| 8,938,505 | B2 * | 1/2015 | Nivala | G06Q 10/101 |
| | | | | 709/205 |
| 9,224,129 | B2 * | 12/2015 | Sitrick | G06Q 10/101 |
| 9,396,279 | B1 * | 7/2016 | O'Donnell | G06F 40/143 |
| 9,547,635 | B2 * | 1/2017 | Bailor | G06F 40/169 |
| 9,613,340 | B2 * | 4/2017 | Safa | G06F 16/93 |
| 9,971,752 | B2 * | 5/2018 | Vagell | G06F 40/197 |
| 2003/0112273 | A1 * | 6/2003 | Hadfield | G06Q 10/10 |
| | | | | 715/751 |
| 2004/0230903 | A1 * | 11/2004 | Elza | G06F 40/166 |
| | | | | 715/234 |
| 2005/0033813 | A1 * | 2/2005 | Bhogal | G06Q 10/10 |
| | | | | 709/206 |
| 2005/0114412 | A1 * | 5/2005 | Gerhard | G06F 16/184 |
| 2005/0193062 | A1 * | 9/2005 | Komine | G06Q 10/10 |
| | | | | 709/204 |
| 2006/0026502 | A1 * | 2/2006 | Dutta | G06F 40/166 |
| | | | | 715/201 |
| 2006/0112107 | A1 * | 5/2006 | Jones | G06F 16/27 |
| 2007/0186157 | A1 * | 8/2007 | Walker | G06F 21/6227 |
| | | | | 715/234 |
| 2008/0059539 | A1 * | 3/2008 | Chin | G06Q 10/10 |
| | | | | 707/999.203 |
| 2008/0301228 | A1 * | 12/2008 | Flavin | G06Q 10/10 |
| | | | | 709/204 |
| 2009/0006948 | A1 * | 1/2009 | Parker | G06F 3/0484 |
| | | | | 715/255 |
| 2009/0125518 | A1 * | 5/2009 | Bailor | H04L 12/1813 |
| 2009/0157811 | A1 * | 6/2009 | Bailor | G06F 40/166 |
| | | | | 709/204 |
| 2009/0249224 | A1 * | 10/2009 | Davis | G06F 40/169 |
| | | | | 715/753 |
| 2009/0271696 | A1 * | 10/2009 | Bailor | G06F 16/954 |
| | | | | 715/229 |
| 2010/0083136 | A1 * | 4/2010 | Komine | G06F 9/52 |
| | | | | 715/255 |
| 2010/0257457 | A1 * | 10/2010 | De Goes | H04L 65/1093 |
| | | | | 707/E17.007 |
| 2010/0318922 | A1 * | 12/2010 | Strathearn | G06F 16/345 |
| | | | | 715/751 |
| 2011/0078246 | A1 * | 3/2011 | Dittmer-Roche | G06F 40/197 |
| | | | | 715/255 |
| 2011/0252303 | A1 * | 10/2011 | Lemonik | G06F 40/197 |
| | | | | 715/234 |
| 2012/0005575 | A1 * | 1/2012 | Colton | G06F 40/166 |
| | | | | 715/255 |
| 2012/0030563 | A1 * | 2/2012 | Lemonik | G06F 40/197 |
| | | | | 715/255 |
| 2012/0109883 | A1 * | 5/2012 | Iordanov | G06Q 10/101 |
| | | | | 707/E17.005 |
| 2012/0110443 | A1 * | 5/2012 | Lemonik | G06F 40/197 |
| | | | | 715/255 |
| 2012/0179647 | A1 * | 7/2012 | Crucs | G06F 40/197 |
| | | | | 707/608 |
| 2012/0284684 | A1 * | 11/2012 | Michaely | G06F 8/40 |
| | | | | 717/103 |
| 2012/0331061 | A1 * | 12/2012 | Lininger | G06F 30/13 |
| | | | | 709/205 |
| 2013/0024418 | A1 * | 1/2013 | Sitrick | G06F 16/00 |
| | | | | 707/608 |
| 2013/0120367 | A1 * | 5/2013 | Miller | G06T 19/00 |
| | | | | 345/419 |
| 2013/0159849 | A1 * | 6/2013 | Lee | G06F 40/169 |
| | | | | 715/272 |
| 2013/0185252 | A1 * | 7/2013 | Palmucci | G06F 40/197 |
| | | | | 707/608 |
| 2013/0218845 | A1 * | 8/2013 | Kleppner | G06F 16/176 |
| | | | | 707/687 |
| 2013/0321457 | A1 * | 12/2013 | Bauermeister | G06F 3/017 |
| | | | | 345/629 |
| 2013/0326330 | A1 * | 12/2013 | Harris | G06F 40/197 |
| | | | | 715/234 |
| 2014/0279903 | A1 * | 9/2014 | Hsiao | G06F 16/2379 |
| | | | | 707/638 |
| 2014/0372369 | A1 * | 12/2014 | Babanov | G06F 16/1767 |
| | | | | 707/608 |
| 2014/0373108 | A1 * | 12/2014 | Bailor | G06F 16/1767 |
| | | | | 726/4 |
| 2015/0113390 | A1 * | 4/2015 | Vagell | G06F 40/106 |
| | | | | 715/255 |
| 2015/0193406 | A1 * | 7/2015 | Lemonik | G06F 40/166 |
| | | | | 715/255 |
| 2015/0261411 | A1 * | 9/2015 | Snook | G06F 3/04817 |
| | | | | 715/751 |
| 2015/0331841 | A1 * | 11/2015 | Antebi | G06F 16/1834 |
| | | | | 715/229 |
| 2015/0365244 | A1 * | 12/2015 | Schmitz | G06F 3/0484 |
| | | | | 715/753 |
| 2015/0370769 | A1 * | 12/2015 | Pereira Filho | G06F 21/6209 |
| | | | | 726/28 |
| 2016/0085978 | A1 * | 3/2016 | Meyer | H04L 63/0861 |
| | | | | 726/28 |
| 2016/0098405 | A1 * | 4/2016 | Gorbansky | G06F 16/93 |
| | | | | 707/749 |
| 2016/0139768 | A1 * | 5/2016 | Lemonik | G06F 40/197 |
| | | | | 715/753 |
| 2016/0328368 | A1 * | 11/2016 | Hyams | G06F 40/194 |
| 2016/0328416 | A1 * | 11/2016 | Rose | H04L 65/403 |
| 2016/0378725 | A1 * | 12/2016 | Marchsreiter | G06F 40/131 |
| | | | | 715/255 |
| 2017/0161313 | A1 * | 6/2017 | Ritter | G06F 16/2365 |
| 2017/0357646 | A1 * | 12/2017 | Ayyar | G06F 16/11 |
| 2018/0063115 | A1 * | 3/2018 | Miller | H04L 63/08 |
| 2018/0173378 | A1 * | 6/2018 | Tinari | G06F 40/166 |
| 2019/0065699 | A1 * | 2/2019 | Bose | G06F 21/00 |
| 2019/0129973 | A1 * | 5/2019 | Truong | G06F 16/93 |
| 2019/0147402 | A1 * | 5/2019 | Sitrick | H04L 12/1822 |
| | | | | 705/301 |
| 2019/0155870 | A1 * | 5/2019 | Prakash | G06F 40/197 |
| 2020/0034438 | A1 * | 1/2020 | Bestfleisch | G06F 16/34 |

OTHER PUBLICATIONS

Kenroy G. Granville, Timothy J. Hickey, CollabEd: A Platform for Collaboratizing Existing Editors, 2009, 7 pages (Year: 2009).*

Real time collaborative editing—how does it work?, retreived from—https://stackoverflow.com/questions/5086699/real-time-collaborative-editing-how-does-it-work, Feb. 23, 2011, 5 pages (Year: 2011).*

Dirk Avery, The Definitive Git Rebase Guide, retreived from—https://medium.com/@dirk.avery/the-definitive-git-rebase-guide-dbd7717f9437, Dec. 19, 2018, 27 pages (Year: 2018).*

(56) References Cited

OTHER PUBLICATIONS

Git-Course, retreived from—https://github.com/gcapes/git-course/blob/eb64655dfc91212a782832c372f0a80a3a8dec73/_episodes/10-rebasing.md, Dec. 3, 2018, 9 pages (Year: 2018).*

* cited by examiner

SYSTEMS AND METHODS FOR COLLABORATIVE EDITING AN ELECTRONIC RESOURCE USING CLIENT DEVICE DESIGNATIONS

CROSS-REFERENCE TO RELATED APPLICATION(S)

This application claims the benefit of Australian patent application no. AU 2019904842, filed Dec. 20, 2019 and titled "Systems and Methods for Collaborative Editing," the disclosure of which is hereby incorporated herein by reference in its entirety.

FIELD

The present disclosure is directed to systems and methods for collaborative editing of electronic resources including documents and other electronic information.

BACKGROUND

Background information described in this specification is background information known to the inventors. Reference to this information as background information is not an acknowledgment or suggestion that this background information is prior art or is common general knowledge to a person of ordinary skill in the art.

Often times new product development and other projects performed using electronic media require content creation from multiple users or contributors. Traditionally, electronic documents have been communicated from person-to-person in order to collect everyone's content and feedback. However, traditional electronic document sharing techniques may be inefficient and lead to multiple copies of outdated versions being circulated. The present disclosure relates to systems and techniques for providing a scalable and robust collaborative editing environment that allows multiple users to work and edit the same electronic resources.

SUMMARY OF THE INVENTION

The appended claims may serve as a summary of the invention.

Figure 1:
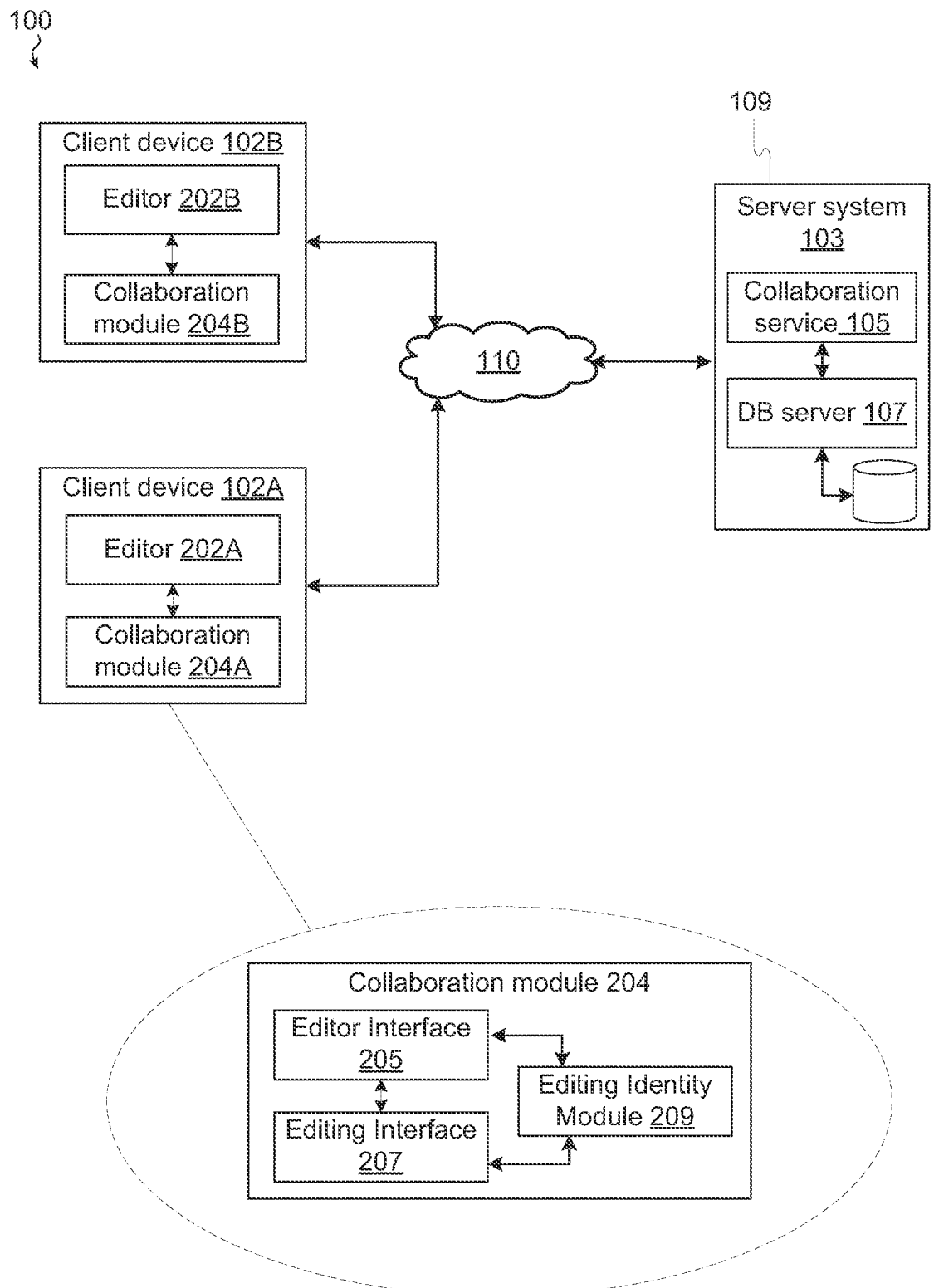
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

In general, collaborative editing may refer to an ability for multiple users to work on and edit the same electronic resource. Software applications (whether installed or provided as web applications), such as word processors, text editors, document production and productivity software, may offer various forms of collaborative editing. Specialised collaboration software (which may be referred to as 'groupware') may be designed to assist teams of users to work on a common task, and may also provide collaborative editing functionality.

One form of collaborative editing facility, also referred to as a "collaborative real-time editor," may enable a single electronic resource to be simultaneously edited by multiple users, each on separate client devices, in real time. It is the role of the collaborative real time editor to manage these multiple edits and merge them into the electronic resource. Any editing conflicts that arise, such as where different users edit the same section of the resource at basically the same time, are managed by the collaborative real-time editor, typically by applying a conflict resolution facility. A collaborative real-time editor may facilitate collaborative editing by allowing users to simultaneously edit shared drafts and see other users' changes in real time. Shared drafts are continuously and automatically saved, which allows the real-time editing and change-viewing to occur.

It is often necessary to dedicate substantial on-premises or cloud network infrastructure (or 'backend') to a collaborative editing facility, and in particular to a collaborative real-time editor. Such infrastructure is required in order to maintain an authoritative copy of the electronic resource being edited, and to implement the conflict resolution facility. In many cases, it can be difficult to scale up for use by more than a modest number of simultaneous users.

FIG. 1 illustrates a networked infrastructure 100 in which aspects of the present disclosure are implemented. The infrastructure 100 includes two or more client devices 102A and 102B, that may be desktop computers, laptop computers, tablet computers, mobile devices, smart watches etc. Only two client devices (102A and 102B) have been illustrated, but normal operation typically involves many more client devices connected to the various other systems in FIG. 1.

Application software 202A and 202B is either installed on each client device 102A and 102B or provided thereto as a web application thorough a web browser (not shown). In the present disclosure, application software 202 is team collaboration software, such as the Applicant's Trello software. However, the principles of the present disclosure can be applied and implemented on virtually any type of application software that provides functionality to create and edit electronic resources (such as documents). As such, application software 202 can include project management software (such as Applicant's 'Jira' suite of products), version control systems, integrated development environments, text editors, word processors, spreadsheets, database management systems and presentation creation software.

In light of this broad applicability, application software 202 is also described as an 'Editor'. Editor 202 can be provided through any suitable means. For example, Editor 202 can be provided as a package from an online registry such as npm.

Editor 202 interfaces with a Collaboration module 204 that provides Editor 202 with collaborative editing functionality including a conflict resolution facility. The conflict resolution facility enables the separate client devices 202A and 202B to establish collaborative editing sessions in which the same document is simultaneously edited by the separate devices in or near real time. For example, Applicant's Trello software provides a facility for organizing projects into boards that contain one or more lists of cards that are used to represent tasks and ideas. Collaboration Module 204 allows the same board to be viewed and edited in real time by the users of the client devices 202A and 202B.

Collaboration module 204 can be provided through any suitable means, including as a package available on a registry such as npm.

Where the Collaboration module 204 and Editor 202 are separate software components, the interface between them may be provided by any suitable means, such as APIs and/or port numbers. Collaboration module 204 is described in further detail below.

In order to provide collaborative editing facilities, Collaboration module 204 is communicatively coupled over a communication network 110 to a Collaboration service 105 that executes on a Server system 103. A Database server 107 executes on the same Server system 103 and provides a connection to a database 109. Depending on the location of the client devices 102A and 102B, communication with the Collaboration service 105 and with each other may be via local or wide area networks, each of which may be private or public. It will be appreciated that based on the required implementation, any suitable communication network 110 may be utilized to allow communication between the systems in environment 100.

Collaboration service 105, through the Database server 107 and database 109, manages the information necessary for collaborative editing of resources, and to this end, selectively communicates required data to the Collaboration modules 204A and 204B on the client devices 102A and 102B. However, as described in greater detail below, in contrast to prior art approaches, the Collaboration service 105 does not maintain an authoritative copy of the requisite document being edited, nor perform any document editing/conflict management itself (e.g. by applying steps or rebasing). By reducing both the volume of information and complexity of processing performed on the Server system 103, the present disclosure provides a collaborative editing facility that can be more readily scaled for use by larger numbers of simultaneous users.

Implementing the Collaboration module 204 as a distinct module that operates in conjunction with an existing editor, allows collaborative editing features to be provided to editors lacking such features, or enhanced collaborative editing features to be provided to editors already having that facility. Providing collaboration features as a distinct module is also advantageous, in that the code of the editor need not be substantially re-written. The functions performed by the Collaboration module 204 can also be directly integrated into the Editor 202 so as to be a native part of the application.

As described in greater detail below, the exemplified Collaboration module 204 provides collaborative editing functionality through the following submodules:

Editor interface 205—that includes suitable software routines and data structures for interfacing the Collaboration module 204 with the Editor 202;

Editing Interface 207—that includes suitable software routines and data structures for receiving proposed edits to the document from both the Editor interface 205 (namely edits proposed by the user of client system 102A), and other collaborators (namely edits received over the network that are proposed by users of other clients e.g. 102B). Editing interface 207 is also responsible for communicating locally proposed edits to the Collaboration service 105 for actioning; and Editing Identity module 209—that stores details of the identity of the current 'leader' of the collaborative editing system (see below).

Figure 2:
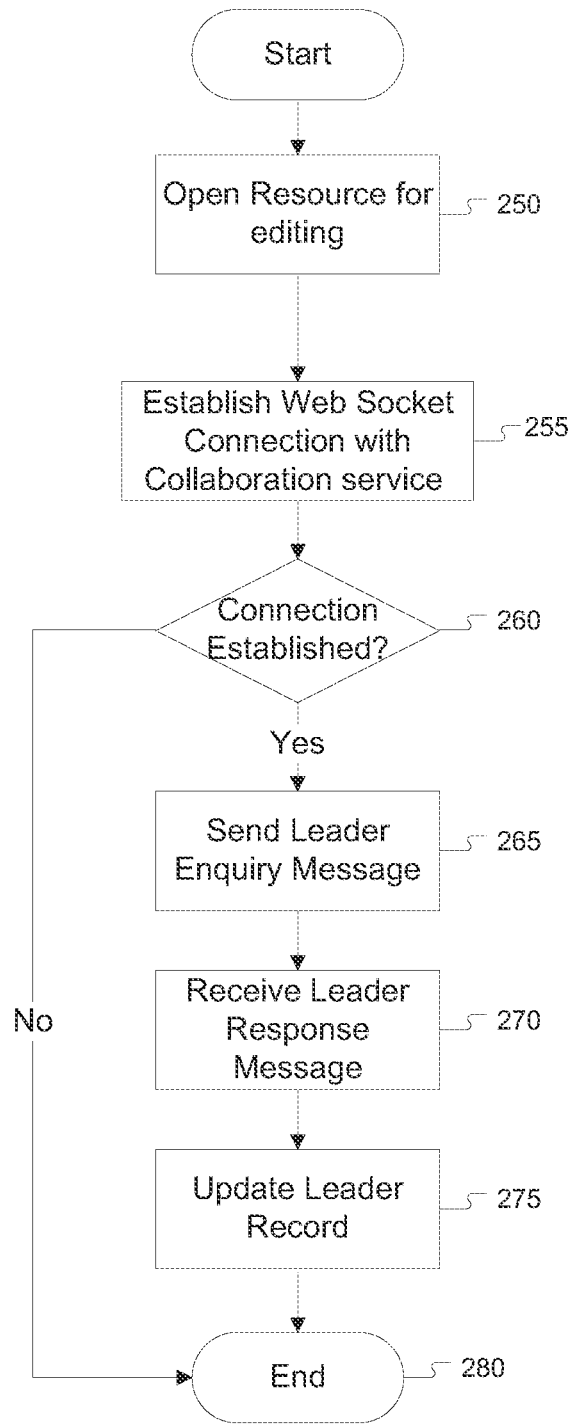
FIG. 2 is a flowchart illustrating the processing performed by a Collaboration module illustrated in FIG. 1 during initialisation of a collaborative editing session.

The initialisation of a collaborative editing session is described with reference to the flowchart of FIG. 2, which illustrates processing performed by a client device 102 (for example client device 102A).

A collaborative editing session commences with a user of client device 102A utilizing the installed Editor 202A to open a resource (such as a document) for editing (step 250). The document is identified on client device 102A with a resource identifier. As noted above, in the present embodiment, the Collaboration module 204A is implemented separately from the Editor 202A, which allows different Editors to selectively use the collaboration service as and when required.

Once the resource is opened, Collaboration module 204A establishes a WebSocket connection with the Collaboration service 105 (step 255). The Collaboration module 204A maintains records of the URLs at which Collaboration services can be reached. A suitable URL is included in the WebSocket handshake request. In an alternative embodiment, the Collaboration module 204 waits until the WebSocket connection is established before opening the resource for editing.

The process continues in the event that a connection is established and terminates if a connection cannot be established (step 260).

The establishment of a WebSocket connection is reflected in the Collaboration module 204A receiving a response message from Collaboration Service 105.

The collaborative editing facility according to the present disclosure is managed by assigning a privileged editing identity to one of the client devices participating in the collaborative editing session. In other words, one of the client devices is designated as the 'leader' of the collaborative editing session. As described below, it is the leader's role to maintain an authoritative version of the document being edited. Once the WebSocket connection is established, Collaboration module 204A obtains the identity of the current leader by sending a Leader Enquiry Message over the WebSocket connection to Collaboration service 105 (step 265). An example of payload data transmitted in a Leader Enquiry Message is as follows:

{
"resourceId": "cloud:identity::object/uuid",
"userId": "cloud:identity::user/uuid",
"timestamp": 1554421764316}

Where "resourceId" is a unique identifier for the resource being edited, "userId" is a unique identifier for the client device 102A, and "timestamp" is a record of the time of transmission of the Leader Enquiry Message.

At step 270, Collaboration module 204 receives a response from the Collaboration service 105 in the form of a Leader Response Message. In this regard, Collaboration service 105 utilises Database server 107 and database 109 to maintain records of collaborative editing sessions, with each record including a field storing the identity of the client device (if any) that is currently designated as leader. The Leader Response Message from the Collaboration service 105 includes in its payload, the identity of the leader (in the form of the leader's client identifier).

In certain scenarios, it will be the client device itself (eg. client device 102A) that is designated leader. For example, if the client device 102A is the only party that is editing the resource, then that client device will be designated the leader. However, in other scenarios, such as where there are already other client devices editing the resource, another client device may already be designated as leader. In any event, at step 275, Collaboration module 204 extracts the leader information from the Leader Response Message, and updates the pertinent record in the Editing Identity Module 209 to store the identity (i.e client identifier) of the designated leader.

The process terminates at step 280.

According to the present embodiment, client device 102A is permitted to edit the resource before it receives the Leader Response Message. In this time period, it is assumed that there is no leader, and any changes made are logged as local "Steps" (see below).

Figure 3:
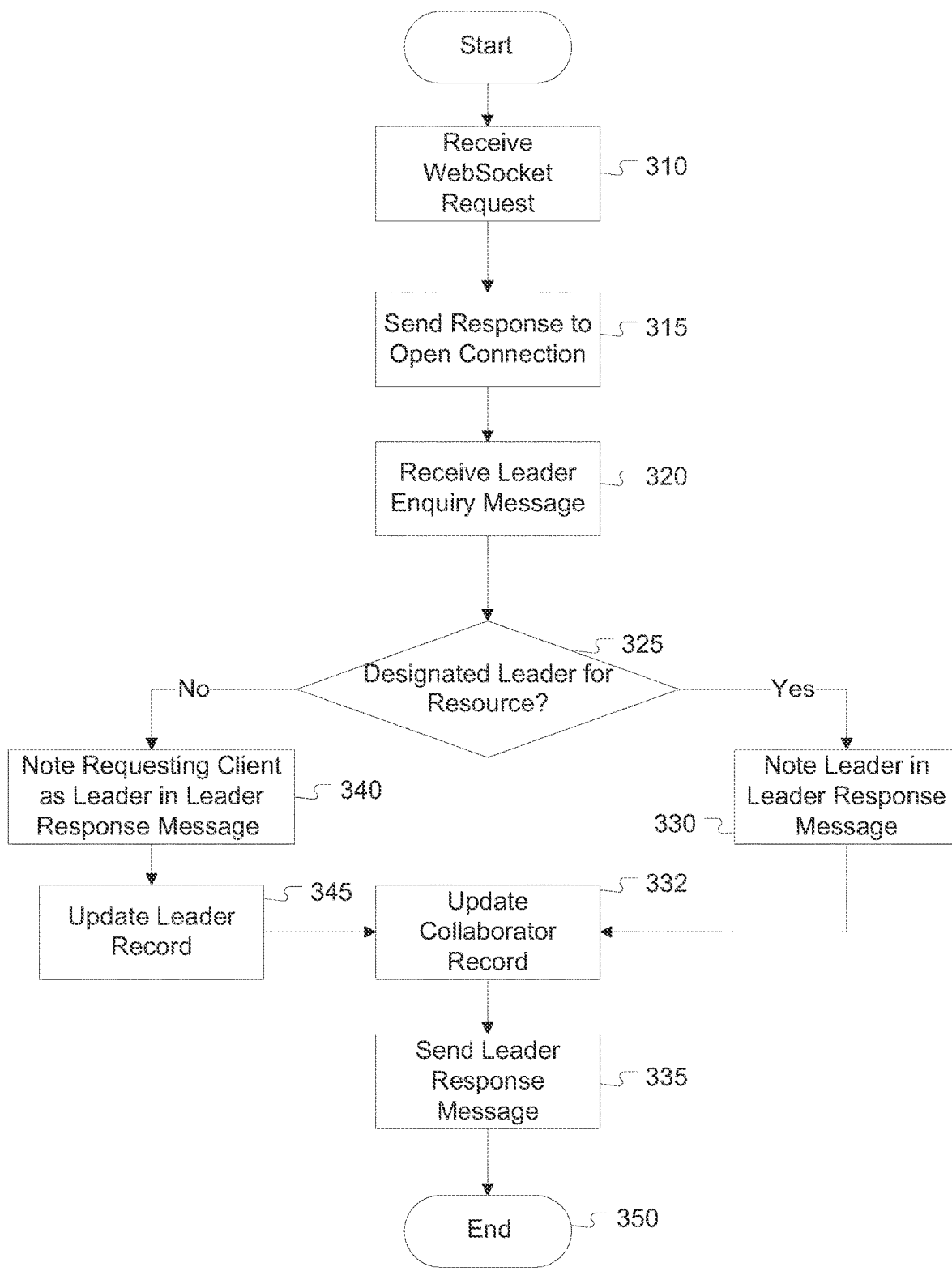
FIG. 3 is a flowchart illustrating the processing performed by a Collaboration service illustrated in FIG. 1 during initialisation of a collaborative editing session.

The initialisation of a collaborative editing session is further described with reference to the flowchart of FIG. 3, which illustrates processing performed by the Collaboration service 105.

At step 310, Collaboration service 105 receives the WebSocket Request message sent by the Collaboration module 204A in step 255 above. Collaboration service 105 sends a WebSocket Response message to Collaboration module 204A to signify the opening of the WebSocket connection (step 315).

At step 320, Collaboration service 105 receives the Leader Enquiry Message sent by the Collaboration module 204A in step 265 above. As noted above, the Leader Enquiry Message includes the resource identifier for the resource being edited by client device 102A. Collaboration service 105 extracts the resource identifier from the Leader Enquiry Message and formats it into a search query to interrogate the records of collaborative editing sessions maintained in database 109. In doing so, Collaboration service 105 determines (step 325) whether there is a leader designated in respect of the identified resource.

In the event that there is a designated leader for the resource, Collaboration service 105 constructs a Leader Response Message (step 330) noting the identity of the leader (by referencing the leader's client identifier) therein. The Leader Response Message also includes an identifier of the latest version of the resource being edited.

The Collaboration service 105 then updates (step 332) the pertinent record in database 109 of the client devices that are editing the resource, by entering the requesting client device's client identifier therein.

In the event that there is no designated leader for the resource, Collaboration service 105 constructs a Leader Response Message (step 340), noting the requesting client device (by that client's unique identifier) as the leader. In this scenario, the Leader Response Message need not include an identifier of the latest version of the resource being edited, as this resource is already open on the requesting client device.

The Collaboration service 105 updates the pertinent record in database 109 to reflect the designation of a leader (and the identity thereof) for the identified resource (step 345). It is this record that is queried in response to the receipt of subsequent Leader Enquiry Messages.

Subsequently, the process returns to step 332, at which the record of client devices participating in the collaborative editing session is updated (by entering the requesting client's unique identifier) to reflect the fact that a new client device has joined the collaborative editing session. The process then returns to step 335, at which the Collaboration service 105 sends the Leader Response Message to the requesting client.

The process terminates at step 350.

The following is an example of a data structure stored in database 109, suitable for maintaining records of collaborative editing sessions. Each client device participating in the collaborative editing session has an assigned record in the data structure. The Resource Identifier, Client ID and Time joined fields are populated from the payload information included in Leader Enquiry Messages. The Time left field is a configurable (and optional) system-generated variable that is used to set a maximum time for collaborative editing sessions. The 'Is Leader' field indicates whether the particular client is the leader of the collaborative editing session.

| Resource identifier | Client ID | Time joined | Time left | Is Leader? |
| --- | --- | --- | --- | --- |

Figure 4:
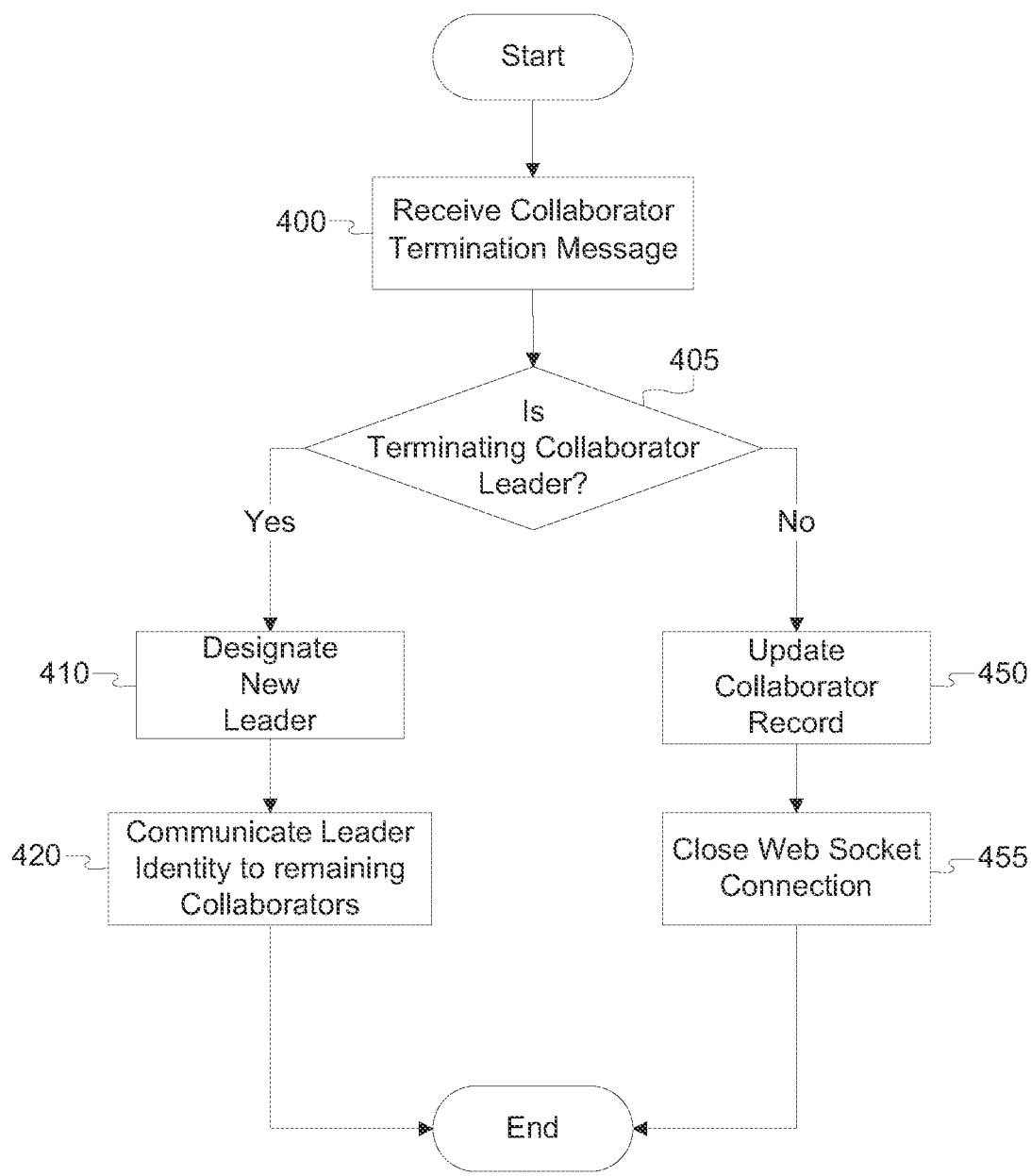
FIG. 4 is a flowchart illustrating the processing performed by a Collaboration service in designating a new leader of a collaborative editing session.

As noted above, the collaborative editing facility designates one of the client devices as the 'leader' of the collaborative editing session. Accordingly, when one of the client devices leaves a collaborative editing session, it may be necessary to designate a new leader. The process steps executed by the Collaboration service 105 in this scenario are described by reference to FIG. 4.

The process commences at step 400 at which the Collaboration service 105 receives a Collaborator Termination Message from one of the client devices 102; thus signalling that that the client device has left the collaborative editing session. In this regard, the Collaboration module 204 executing on the relevant client device 102, sends a Collaborator Termination Message (over the WebSocket connection) when the Collaboration module 204 detects that the resource being edited, or the Editor 202 itself, has been closed. The Collaboration module 204 can also send a Collaborator Termination Message when it detects that the user of client device 102 has not interacted with the resource for a prescribed timeout period.

The Collaborator Termination Message includes the: client identifier; resource identifier, and a timestamp.

At step 405, the Collaboration service 105 extracts the client identifier and resource identifier from the Collaborator Termination Message, and queries the collaborative editing records stored in database 109 to determine whether the client device identified by the client identifier is the leader of the collaborative editing session. In the event that the client device is not the leader, the process proceeds to step 450, at which the Collaboration service 105 updates the records of the collaborative editing session maintained in database 109 by removing the relevant record (namely the record that includes client device's client identifier) therefrom. The Collaboration service 105 then closes (step 455) the Web-Socket connection with the client device.

In the event that the client device is the leader, the process proceeds to step 410, at which the Collaboration service 105 designates a new leader of the collaborative editing session. The various processes performed by the Collaboration service 105 in designating a new leader are described below.

After the Collaboration service 105 designates a new leader, the process proceeds to step 420, at which the Collaboration service 105 generates a Leader Identity message that includes the client identifier of the newly-designated leader. The Collaboration service 105 communicates the Leader Identity message over the WebSocket connections to each of the client devices remaining in the collaborative editing session. The Collaboration service 105 utilises the records of the collaborative editing session maintained in database 109 to correctly address the Leader Identity messages. Upon receipt of a Leader Identity message at a client device 102, the Collaboration module 204 extracts the client identifier from the Leader Identity message and suitably updates the Editing Identity Module 209.

The Collaboration service 105 can perform a number of different processes to designate a new leader. According to one embodiment, the Collaboration service 105 designates a new leader by reference to the time that each of the remaining collaborators joined the session. The new leader can be the earliest, latest or other order of participant to join the session. The Collaboration service 105 accesses such temporal information from the records of the collaboration session maintained on database 109.

Alternatively, the Collaboration service 105 designates the new leader by reference to non-temporal criteria. For example, Collaboration service 105 can designate the new leader by reference to the client device that has contributed the most Steps to the document being edited (see below).

According to the present disclosure, the state of the resource is stored on the client devices 102, with the Collaboration service 105 not being involved in saving or publishing any changes to the resource. This is implemented by each client device saving the document in the usual manner and relying on the Editor 202 (eg Trello) to maintain a local copy of the document.

Figure 5:
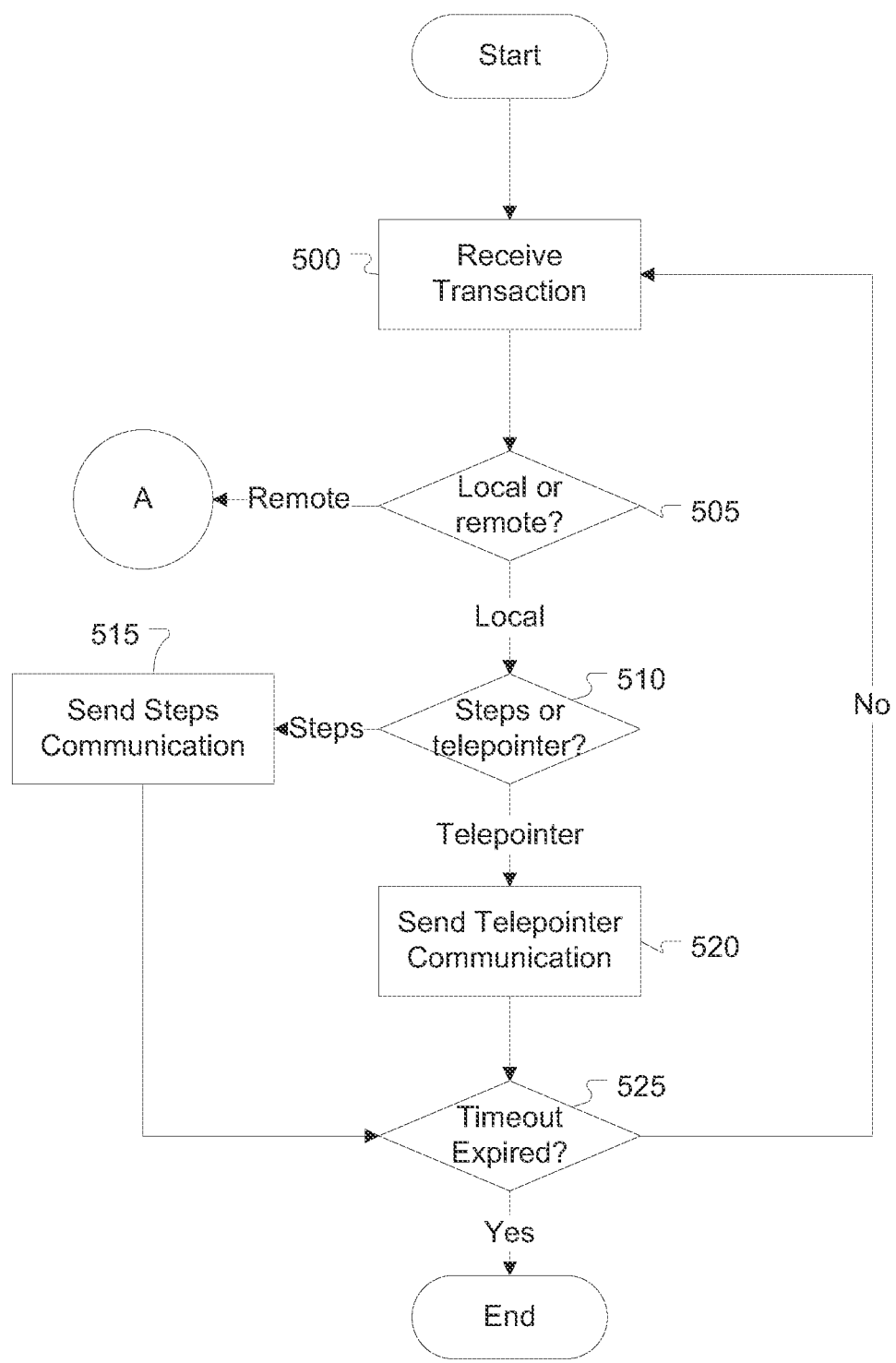
FIGS. 5 and 6 are flowcharts illustrating the processing performed by a client device when participating in a collaborative editing session according to the present disclosure.

An example embodiment of a collaborative editing facility according to the present disclosure is illustrated by reference to the flow charts in FIGS. 5 and 6. In the illustrated embodiment, a client device 102 is using Editor 202 in a collaborative editing session to edit a resource. Editor 202 generates 'Transactions' to encapsulate the edits that the user of client device 102 makes. In this regard, a Transaction can include one or more "Steps", each of which is an atomic and well-defined modification to the resource. A Transaction can also include location information used to move a shared telepointer or cursor about the Editor's 202 user interface. As described below, Steps are 'applied' to the resource that results in the generation of a new resource.

A user of Editor 202 can communicate Transactions to the Collaboration module 204. The Collaboration module 204 also receives Transactions from the Collaboration service 105. Such received Transactions can include resource edits and telepointer updates made by other the users of other client devices 102 participating in the collaborative editing session.

The process commences at step 500, at which the Collaboration module 204 receives a Transaction. At step 505, Collaboration module 204 performs a determination (step 505) of whether the received Transaction is local (i.e. received from the installed Editor 202) or remote (i.e. received from Collaboration service 105). Transactions received from the Collaboration service 105 relate to changes made by users of other client devices 102 to the resource being collaboratively edited.

The process proceeds to step A (illustrated in FIG. 6 and described below) in the event that the received Transaction is remote.

The process proceeds to step 510 in the event that the Transaction is local (i.e. received from the local editor 202), at which the Collaboration module 204 determines whether the Transaction includes Steps that are to be applied to the document or telepointer updates. In the event that the Transaction includes Steps, Collaboration module 204 executes functionality to send (step 515) a Steps Communication over the WebSocket connection to the Collaboration service 105. A representative data payload for a Steps Communication is as follows:

{
"userId": "cloud:identity::user/uuid",
"type": "unaccepted",
"steps": [ ],
"version":
}, Where "userId" is the unique client identifier for the client device, "type" refers to the type of data contained in the message (in this case unaccepted Steps), "steps" is a list of the Steps proposed by the collaborator, and "version" is the current version of the document to which the Steps were applied.

As described below, upon receipt of a Steps Communication, Collaboration service 105 causes the Steps Communication to be communicated over the WebSocket connection to the currently designated leader.

In the event that the Transaction includes telepointer updates (indicating that the user of client device 102 moved their cursor or changed a selection of the document without making a change to the document itself), Collaboration module 204 executes functionality to send (step 520) a Telepointer Communication over the WebSocket connection to the Collaboration service 105. An indicative payload for a Telepointer Communication is as follows:

{
"userId": "cloud:identity::user/uuid",
"type": "telepointer",
"timestamp": 1554421764316,
"selection": {
"type": "textSeletion"|37 nodeSelection",
"anchor": 1,
"head": 10
}
}

Where "userID" is the unique client identifier for the client device, "type" refers to the type of data contained in the Transaction (in this case telepointer data), "timestamp" is the time at which the user interaction occurred, and "selection" is a data structure containing details of the user interaction itself, namely whether it is a text selection or node selection and an anchor and head values for the selection.

On receiving a Telepointer Communication, Collaboration service 105 transmits the Telepointer Communication to all client devices 102 listed in database 109 as participating in the collaborative editing session. Receipt and handling of such an event is described further below.

After sending a Steps Communication or a Telepointer Communication, the Collaboration module 204 performs a determination (step 525) of whether a timeout period has expired since the user last interacted with the document. The process terminates in the event that the timeout period has expired. If the timeout period has not expired, the process returns to step 500, at which the Collaboration module waits to receive further Transactions.

Figure 6:
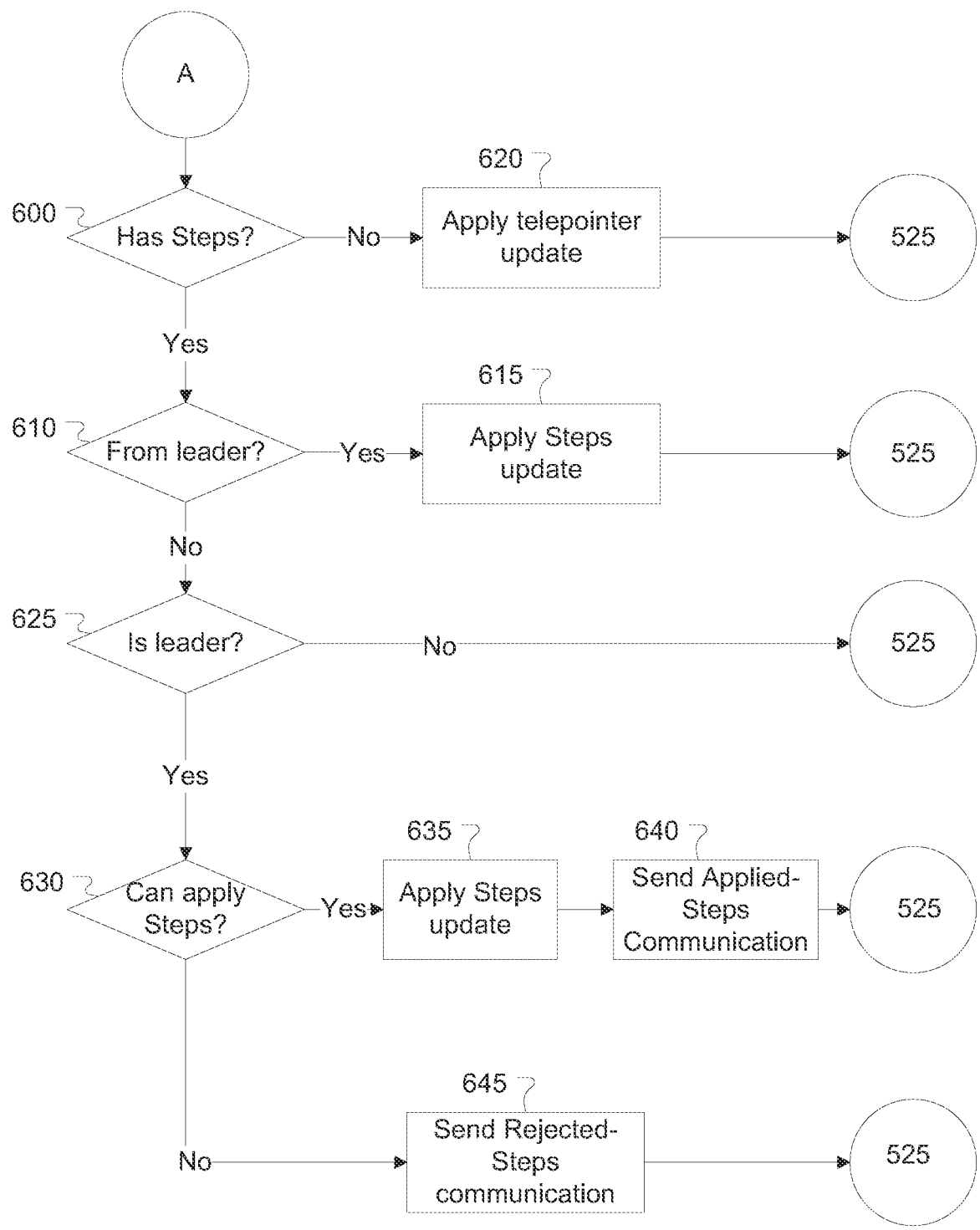

The functionality (step 'A') performed by Collaboration module in the event that the Transaction is remote is illustrated in FIG. 6.

The process commences at step 600, at which Collaboration module 204 determines whether the Transaction includes Steps that are to be applied to the resource that is the subject of collaborative editing. In the event of a positive determination, the method proceeds to step 610, at which the Collaboration module 204 determines (by extracting information from the received Step Communication) whether the Transaction was received from the leader. The method proceeds to step 615 in the event of a positive determination, at which Collaboration module 204 causes the Editor 202 to apply the Steps to the resource the subject of collaborative editing. In this regard, the collaborative editing facility according to the present disclosure involves the Collaboration module 204 monitoring changes to the local version of the document (i.e 'unconfirmed' changes) and periodically submitting them to the leader for acceptance or rejection. 'Accepted' Steps are those that have been submitted to the leader and confirmed. Consequently, the fact that a Transaction is received from the leader means that the included Steps are accepted and can be applied to the version of the document resident on a non-leader client.

The process returns to step 525 (FIG. 5) after the Steps are applied to the document, at which the Collaboration module determines whether the timeout period has expired.

Returning to step 600, in the event that Collaboration module 204 determines that the Transaction does not include Steps, the method proceeds to step 620, at which Collaboration module 204 instructs Editor 202 to apply the telepointer data to the resource (step 620).

The process returns to step 525 (FIG. 5) after the telepointer data is applied to the resource, at which the Collaboration module 204 determines whether the timeout period has expired.

Optionally, the Collaboration module 204 may make a determination of whether the Transaction includes other data apart from Steps or telepointer data. This allows for convenient expansion of the system to accommodate Transactions apart from Steps and telepointer data.

Returning to step 610, in the event that the Transaction was not received from the leader, Collaboration module 204 makes a further determination (step 625) by reference to the data stored in the Editing Identity Module 209, of whether it is the leader. As discussed further below, being the leader client of a collaborative editing session is tantamount to acting as a central authority. However, in contrast to the approaches of the prior art, it is one of the client devices 102 that is the leader, rather than a backend server assuming that role.

Where the client device 102 is not the leader and has received Steps from a client device that is also not the leader, the Steps necessarily cannot be approved Steps. Such Steps should not be applied to the version of the document resident on the client device. In this scenario, the process returns to step 525 (FIG. 5), at which the Collaboration module 204 determines whether the timeout period has expired.

Where the client device is the leader, the method proceeds to step 630, at which the Collaboration module 204 executing on the leader client device 102 determines whether the Steps can be applied. As discussed below, this determination is made depending on the version of the document to which the user of the client device applied the Steps (that information being included in the Steps Communication sent by the client device in step 515 above). The leader applies the Steps (step 635) if that version of the document is the same as the leader's version of the document. In this scenario, the leader accepts the Steps and applies them to the resident copy of the document.

Each accepted Step increments the document version number by 1.

After applying the Steps, the Collaboration module 204 executing of the leader client device generates an Applied-Steps Communication (step 640) and forwards same over the Web Socket Connection to the Collaboration service 105. A representative data payload for a Applied-Steps Communication from a leader is as follows:

{
"userId": "cloud:identity::user/uuid",
"type": "accepted",
"steps": [ ],
"version":
}, Where "userId" is the unique client identifier for the leader, "type" refers to the type of data contained in the message (in this case accepted Steps), "steps" is a list of the Steps that are to be applied, and "version" is the current version of the document to which the Steps are to be applied.

Upon receipt of a Steps Communication, the Collaboration service 105, using the collaborative editing data stored in database 109, sends (step 560) a broadcast message including the same data to each of the client devices 102 in the collaborative editing session. As noted above, each Collaboration module 204, upon receipt of an Applied-Steps Communication from the leader, instructs Editor 202 to apply the Steps to the version of the document resident on that client device 102. The acceptance determination performed earlier by the leader (namely comparing the leader's version of the document to the version of the document resident on a client device) ensures that Steps are only applied to an authoritative version of the document.

The process returns to step 525 (FIG. 5) after the Applied-Steps Communication is sent, at which the Collaboration module 204 determines whether the timeout period has expired.

Returning to step 630, in the event that the leader client device determines that the Steps cannot be applied (namely where the leader's version of the resource differs from the version of the resource resident on the client device referenced in the Steps communication), Collaboration module 204 executing on the leader generates (step 645) a Rejected-Steps Communication and forwards same over the Web Socket Connection to the Collaboration service 105. A representative data payload of a Rejected-Steps Communication is as follows:

{
"userId": "cloud:identity::user/uuid",
"type": "rejected",
"steps": [ ],
"version":
"recipient": [ ]
}, Where "userId" is the unique client identifier for the leader, "type" refers to the type of data contained in the message (in this case rejected Steps), and "steps" is a list of the Steps that are "missing" from the client device's document. Such a list is sent rather than the rejected Steps originally sent by the client device, to allow the client device to restore their local version of the document. Changes can then be suitably made to the restored document and resubmitted to the leader for approval if required. "Version" is the version of the document to which the Steps are to be applied. "Recipient" is the author (i.e., the particular client device) of the rejected Steps.

Upon receipt of a Rejected Step Communication, the Collaboration service 105, using the collaborative editing data stored in database 109, sends a unicast message (containing the same information) to the originating client device of the rejected Steps. Upon receipt of the Rejected Step Communication, the Collaboration module 204 executing on the originating client device instructs Editor 202 to apply the Steps to the client device's local version of the document. This allows the originating client device to restore their local version of the document.

The process returns to step 525 (FIG. 5) after Applied-Steps Communication is sent, at which the Collaboration module 204 determines whether the timeout period has expired.

Optionally, if the Collaboration module 204 determines that it is not the leader (step 625), a further determination can be made of whether the collaborative editing session has a current leader appointed. A negative determination is tantamount to the client device acting as a local authority only. In this scenario, the client device stores any received Steps in local storage, pending a determination of whether it has been appointed the new leader. If the collaborator is appointed the new leader, processing returns to step 630 at which the client device determines whether the Steps can be applied.

Figure 7:
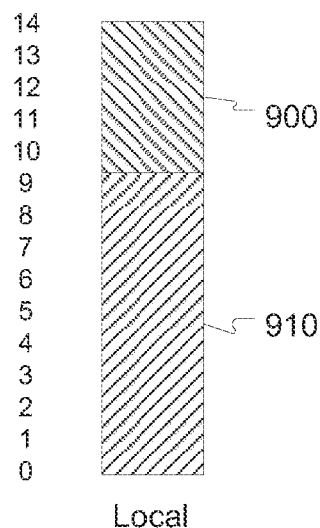
FIGS. 7 to 10 are block diagrams illustrating an example conflict management system that may be implemented on the collaborative editing system according to the present disclosure.

An embodiment of a collaborative editing and conflict resolution facility suitable for implementation with the present disclosure is illustrated by reference to FIGS. 7-10. As noted above, each client device 102 is required to keep track of any local unconfirmed changes to the resident document. FIG. 7 schematically illustrates a local copy of a document maintained by a client device having unconfirmed Steps 900 and confirmed Steps 910.

As noted above, Steps are forwarded to the leader for assessment and either acceptance or rejection. Each confirmed Step increases the resource version number maintained by the leader by 1, whereas unconfirmed steps do not contribute to a change of version number.

Figure 8:
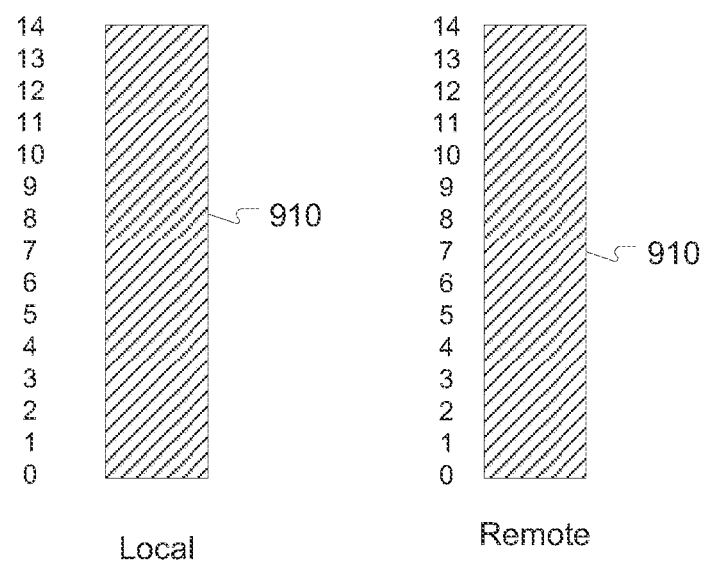

As noted above, when Steps are sent to the leader, they include an indication of the version of the document to which the Steps were applied locally. If the local version matches the leader's version (as indicated in FIG. 8) the Steps are accepted and applied to the leader's version. The leader's version with the applied Steps then becomes the new authoritative version.

Figure 9:
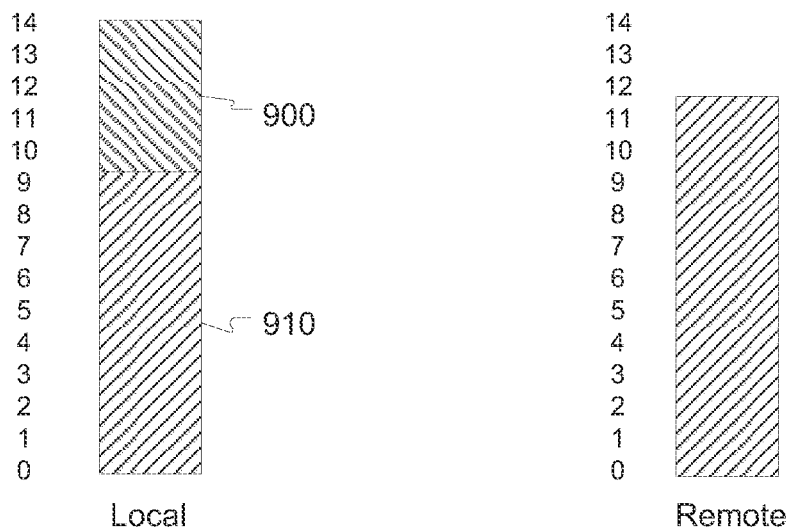

Alternatively, if the leader's version of the document does not coincide with the local version (as indicated in FIG. 9), such as when the leader's version is "ahead" of the local version, the Steps cannot be applied, and are thus rejected. A lack of concordance between the versions indicates that another client device previously applied accepted Steps to the earlier version of the document.

Figure 10:
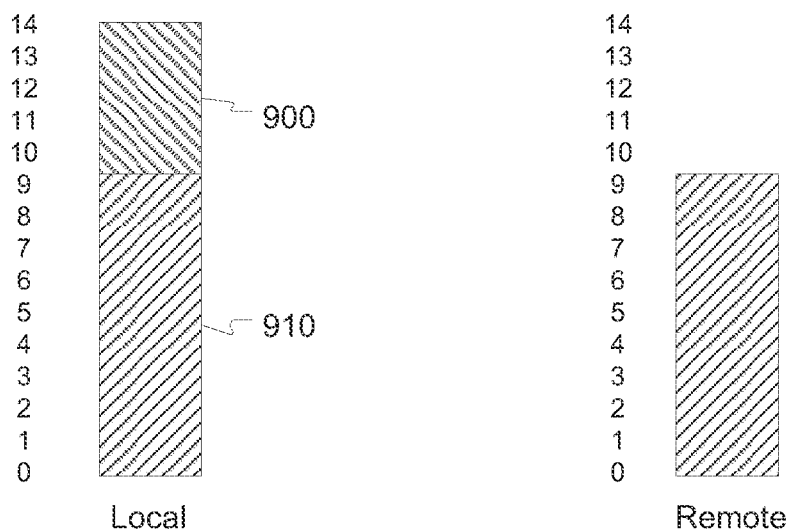

Rebasing of documents is performed by having local Steps rebased on top of the authoritative version of the document (as indicated in FIG. 10). The git rebasing approach can be used with the present disclosure. More specifically, local Steps are undone and kept in memory. Accepted Steps are applied and then the local Steps are applied again. This procedure may result in some local Steps being discarded, if they no longer produce a meaningful edit to the document.

The present disclosure can be implemented to operate in conjunction with the real-time Collaborative editing facility provided by the Applicant's Confluence software product. However, the present disclosure in some senses externally 'overrides' the operation of the existing editor by interposing the stateless approach.

The collaborative editing system according to the present disclosure can be implemented using alternative communication protocols to WebSockets. For example, the system can be implemented using publish/subscribe messaging, in which messages are sent (by "publishers") to "topics" rather than to specific receivers. Likewise, receivers subscribe to topics of interest and then receive all relevant messages without knowledge of the identity of the publisher.

The features and techniques of the present disclosure are implemented using one or more computer processing systems.

Figure 11:
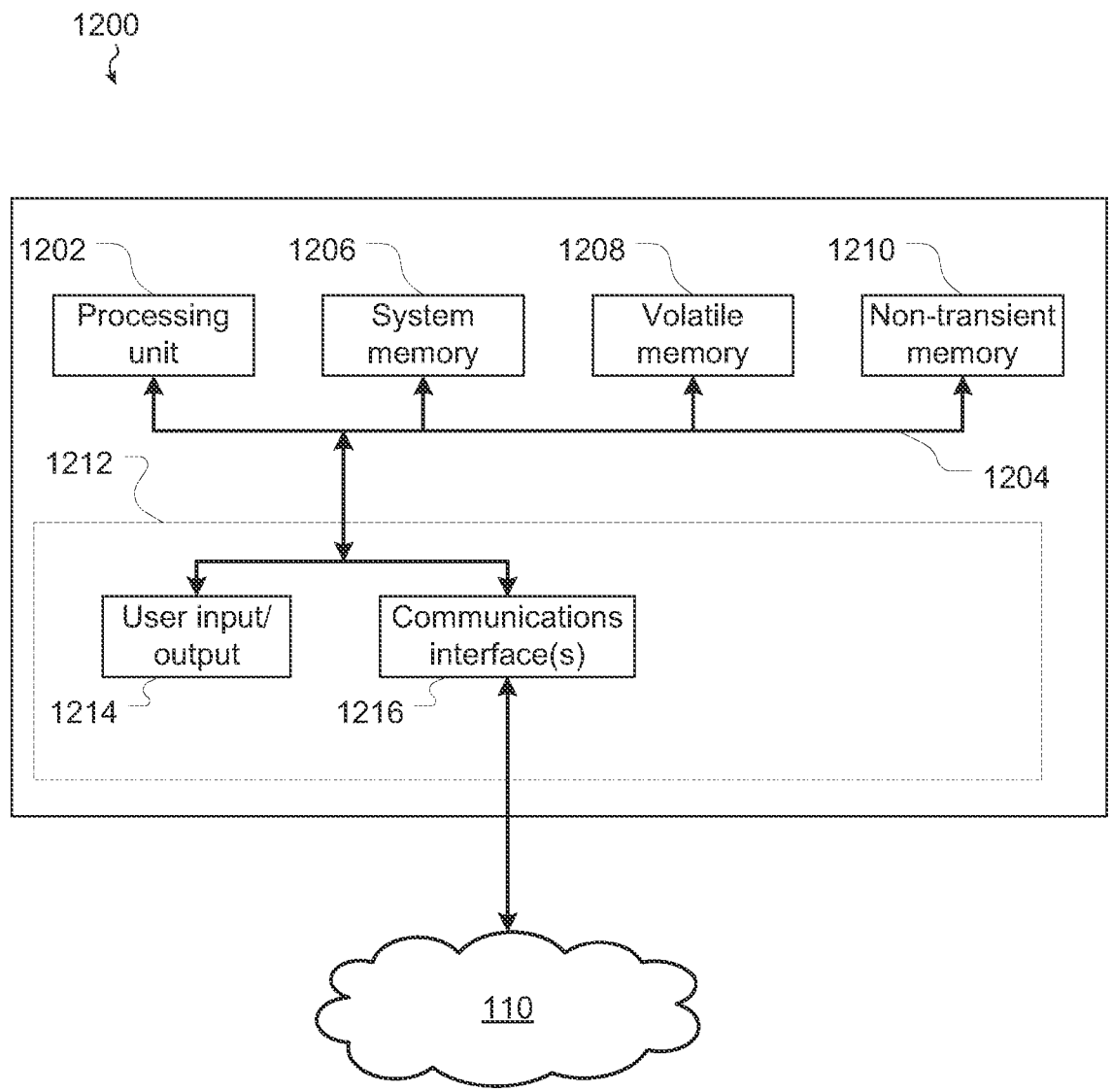
FIG. 11 is a block diagram of a computer processing system configurable to perform various features of the present disclosure.

FIG. 11 provides a block diagram of a computer processing system 1200 configurable to implement embodiments and/or features described herein. System 1200 is a general purpose computer processing system. It will be appreciated that FIG. 11 does not illustrate all functional or physical components of a computer processing system. For example, no power supply or power supply interface has been depicted, however system 1200 will either carry a power supply or be configured for connection to a power supply (or both). It will also be appreciated that the particular type of computer processing system will determine the appropriate hardware and architecture, and alternative computer processing systems suitable for implementing features of the present disclosure may have alternative components to those depicted.

Computer processing system 1200 includes at least one processing unit 1202. The processing unit 1202 may be a single computer processing device (e.g. a central processing unit, graphics processing unit, or other computational device), or may include a plurality of computer processing devices. In some instances all processing will be performed by processing unit 1202, however in other instances processing may also be performed by remote processing devices accessible and useable (either in a shared or dedicated manner) by the system 1200.

Through a communications bus 1204 the processing unit 1202 is in data communication with a one or more machine readable storage (memory) devices which store (computer readable) instructions and/or data for controlling operation of the processing system 1200. In this example system 1200 includes a system memory 1206 (e.g. a BIOS), volatile memory 1208 (e.g. random access memory such as one or more DRAM modules), and non-volatile memory 1210 (e.g. one or more hard disk or solid state drives).

System 1200 also includes one or more interfaces, indicated generally by 1212, via which system 1200 interfaces with various devices and/or networks. Generally speaking, other devices may be integral with system 1200, or may be separate. Where a device is separate from system 1200, connection between the device and system 1200 may be via wired or wireless hardware and communication protocols, and may be a direct or an indirect (e.g. networked) connection.

Wired connection with other devices/networks may be by any appropriate standard or proprietary hardware and connectivity protocols. For example, system 1200 may be configured for wired connection with other devices/communications networks by one or more of: USB; Fire Wire; eSATA; Thunderbolt; Ethernet; OS/2; Parallel; Serial; HDMI; DVI; VGA; SCSI. Other wired connections are possible.

Wireless connection with other devices/networks may similarly be by any appropriate standard or proprietary hardware and communications protocols. For example, system 1200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 1200 connects-whether by wired or wireless means-include one or more input devices to allow data to be input into/received by system 1200 for processing by the processing unit 1202, and one or more output device to allow data to be output by system 1200. Example devices are described below, however it will be appreciated that not all computer processing systems will include all mentioned devices, and that additional and alternative devices to those mentioned may well be used.

For example, system 1200 may include or connect to one or more input devices by which information/data is input into (received by) system 1200. Such input devices may include keyboards, mice, trackpads, microphones, accelerometers, proximity sensors, GPS devices and the like. System 1200 may also include or connect to one or more output devices controlled by system 1200 to output information. Such output devices may include devices such as a CRT displays, LCD displays, LED displays, plasma displays, touch screen displays, speakers, vibration modules, LEDs/other lights, and such like. System 1200 may also include or connect to devices which may act as both input and output devices, for example memory devices (hard drives, solid state drives, disk drives, compact flash cards, SD cards and the like) which system 1200 can read data from and/or write data to, and touch screen displays which can both display (output) data and receive touch signals (input).

System 1200 may also connect to one or more communications networks (e.g. the Internet, a local area network, a wide area network, a personal hotspot etc.) to communicate data to and receive data from networked devices, which may themselves be other computer processing systems.

System 1200 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console. [note repetition in computer processing system description]

Typically, system 1200 will include at least user input and output devices 1214 and a communications interface 1216 for communication with a network such as network 110 of environment 100.

System 1200 stores or has access to computer applications (also referred to as software or programs)—i.e. computer-readable instructions and data which, when executed by the processing unit 1202, configure system 1200 to receive, process, and output data. Instructions and data can be stored on non-transitory machine readable storage medium accessible to system 1200. For example, instructions and data may be stored on non-transitory memory 1210. Instructions and data may be transmitted to/received by system 1200 via a data signal in a transmission channel enabled (for example) by a wired or wireless network connection.

Applications accessible to system 1200 will typically include an operating system application such as Microsoft Windows®, Apple OSX, Apple IOS, Android, Unix, or Linux.

System 1200 also stores or has access to applications which, when executed by the processing unit 1202, configure system 1200 to perform various computer-implemented processing operations described herein. For example, and referring to the networked environment of FIG. 1 above, client system 102 includes an Editor 202 and Collaboration module 204 which configures the client system 102 to perform the described client system operations. Similarly, server system 102 includes a Collaboration service 105 which configures the server system to perform the described server system operations, In some cases part or all of a given computer-implemented method will be performed by system 1200 itself, while in other cases processing may be performed by other devices in data communication with system 1200.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A non-transitory storage medium storing instructions executable by a processing unit of a remote server instantiating a remote collaborative editing service, the instructions including steps for:
- establishing communication with a client application instantiated on each client device of a set of client devices, the client application providing an editor executing on each client device for editing a resource;
- querying, using a resource identifier for the resource, a database that maintains records of collaborative editing sessions, wherein each record of one or more records in the database store a corresponding resource identifier, a client device identifier, and a privileged device field, the client device identifier indicating an identity of one of the set of client devices, and the privileged device field identifying a privileged editor device for the resource associated with the resource identifier;
- designating, for a collaborative editing session, a client device of the set of client devices as the privileged editor device based on querying the database using the resource identifier for the resource, and identifying that each other client device associated with the resource identifier is a non-privileged editor device;
- in response to a request for the resource from a the client device of the set of client devices, transmitting the resource to the respective client device;
- in response to receiving a first set of proposed edits to content of the resource from a first client device of the set of client devices, relaying the first set of proposed edits to the privileged editor device designated for the collaborative editing session;
- in response to receiving a second set of proposed edits to the content of the resource from a second client device of the set of client devices, relaying the second set of proposed edits to the privileged editor device designated for the collaborative editing session;
- receiving a modified version of the resource from the client device designated as the privileged editor device, the modified version generated by the privileged editor device by resolving conflicts between the first set of proposed edits and the second set of proposed edits as applied to content of an authoritative version of the resource locally stored on the client device designated as the privileged editor device; and
- in response to a request for the resource from the set of client devices, transmitting the modified version of the resource to the respective client devices.

2. The non-transitory storage medium according to claim 1, further storing instructions configured to cause the processing unit to communicate accepted edits in the modified version of the resource, via broadcast, to a respective client device registered with the remote collaborative editing service as participating in the collaborative editing session.

3. The non-transitory storage medium according to claim 1, further storing instructions configured to cause the processing unit to communicate rejected edits in the modified version of the resource to a respective client device that communicated a set of proposed edits that correspond to the rejected edits.

4. The non-transitory storage medium according to claim 3, wherein the instructions are configured to further cause the processing unit to restore the resource in the respective client device to the modified version of the resource.

5. The non-transitory storage medium according to claim 1, wherein each of the first set of proposed edits and the second set of proposed edits received from the respective client device includes a version identifier identifying a version of the resource resident on the respective client device to which the proposed edits relate, the privileged editor device accepting or rejecting the proposed edits depending on whether the version identifier matches that of the authoritative version.

6. The non-transitory storage medium according to claim 1, wherein the remote collaborative editing service does not maintain a copy of the resource.

7. The non-transitory storage medium according to claim 1, wherein the first or the second set of proposed edits further include telepointer updates on the resource indicating movement of a cursor or changed selection of a portion of the resource.

8. A computer processing system comprising:
- a set of client devices, each client device having instantiated thereon a client application that provides an editor for editing a resource; and
- a server communicably connected to the set of client devices, the server comprising:
  - a processing unit instantiating a remote collaborative editing service; and
  - a non-transitory computer-readable storage medium storing sequences of instructions, which when executed by the processing unit, cause the processing unit to:
  - establish communication with the client application on each client device of the set of client devices;
  - query, using a resource identifier for the resource, a database that maintains records of collaborative editing sessions, wherein each record of one or more records in the database store a corresponding resource identifier, and a client device identifier, and a privileged device field, the client device identifier indicating an identity of the client device one of the set of client devices, and the privileged device field identifying a privileged editor device for the resource associated with the resource identifier;
  - designate, for a collaborative editing session, a client device of the set of client devices as the privileged editor device based on querying the database using the resource identifier for the resource, and identifying that each other client device associated with the resource identifier is a non-privileged editor device;
  - in response to a request for the resource from a respective client device of the set of client devices, transmit the resource to the respective client device;
  - in response to receiving a first set of proposed edits to content of the resource from a first client device of the set of client devices, relay the first set of proposed edits to the privileged editor device designated for the collaborative editing session;
  - in response to receiving a second set of proposed edits to the content of the resource from a second client device of the set of client devices, relay the second set of proposed edits to the privileged editor device designated for the collaborative editing session;
  - receive a modified version of the resource from the client device designated as the privileged editor device, the modified version generated by the privileged editor device by resolving conflicts between the first set of proposed edits and the second set of proposed edits as applied to content of an authoritative version of the resource locally stored on the client device designated as the privileged editor device; and in response to a request for the resource from the set of client devices, transmit the modified version of the resource to the respective client devices.

9. The computer processing system according to claim 8, wherein the sequences of instructions cause the processing unit of the server to communicate accepted edits in the modified version of the resource, via broadcast, to a respective client device registered with the remote collaborative editing service as participating in the collaborative editing session.

10. The computer processing system according to claim 8, wherein the sequences of instructions cause the processing unit of the server to communicate rejected edits in the modified version of the resource to a respective client device that communicated a set of proposed edits that correspond to the rejected edits.

11. The computer processing system according to claim 10, wherein the instructions are configured to further cause the processing unit to restore the resource in the respective client device to the modified version of the resource.

12. The computer processing system according to claim 8, wherein each of the first set of proposed edits and the second set of proposed edits received from the respective client device includes a version identifier identifying a version of the resource resident on the respective client device to which the proposed edits relate, the privileged editor device accepting or rejecting the proposed edits depending on whether the version identifier matches that of the authoritative version.

13. The computer processing system according to claim 8, wherein the remote collaborative editing service does not maintain a copy of the resource.

14. The computer processing system according to claim 8, wherein the first or the second set of proposed edits further include telepointer updates on the resource indicating movement of a cursor or changed selection of a portion of the resource.

15. A computer implemented method executed by a processing unit of a server instantiating a remote collaborative editing service:

establishing communication with a client application instantiated on each client device of a set of client devices, the client application providing an editor executing on each client device for editing a resource;

querying, using a resource identifier for the resource, a database that maintains records of collaborative editing sessions, wherein each record of one or more records in the database store a corresponding resource identifier, and a client device identifier, and a privileged device field, the client device identifier indicating an identity of the client device one of the set of client devices, and the privileged device field identifying a privileged editor device for the resource associated with the resource identifier;

designating, for a collaborative editing session, a client device of the set of client devices as the privileged editor device based on querying the database using the resource identifier for the resource, and identifying that each other client device is associated with the resource identifier is a non-privileged editor device;

in response to a request for the resource from a respective client device of the set of client devices, transmitting the resource to the respective client device;

in response to receiving a first set of proposed edits to content of the resource from a first client device of the set of client devices, relaying the first set of proposed edits to the privileged editor device designated for the collaborative editing session;

in response to receiving a second set of proposed edits to the content of the resource from a second client device of the set of client devices, relaying the second set of proposed edits to the privileged editor device designated for the collaborative editing session;

in response to receiving user input with respect to the content of the resource from the privileged editor device, generate a transaction corresponding to the user input with respect to the content item at the privileged editor device;

transmitting the transaction to all client devices of the set of client devices;

receiving a modified version of the resource from the client device designated as the privileged editor device, the modified version generated by the privileged editor device by resolving conflicts between the first set of proposed edits and the second set of proposed edits as applied to content of an authoritative version of the resource locally stored on the client device designated as the privileged editor device; and in response to a request for the resource from the set of client devices, transmitting the modified version of the resource to the respective client devices.

16. The computer implemented method according to claim 15, wherein the first or the second set of proposed edits further include telepointer updates on the resource indicating movement of a cursor or changed selection of a portion of the resource.

17. The computer implemented method according to claim 16, wherein the client device is designated as the privileged editor device based on a time when the client device joined the collaborative editing session related to the resource.

* * * * *